United States Patent [19]

Martin et al.

[11] 3,901,755
[45] Aug. 26, 1975

[54] BONDING OF POLYMERS BY SURFACE ACTIVATION

[75] Inventors: Wilhelm N. Martin, Montreal; Werner Lichtenberger, Grand'Mere, both of Canada

[73] Assignee: Consolidated-Bathurst Limited, Montreal, Canada

[22] Filed: May 17, 1973

[21] Appl. No.: 361,381

[52] U.S. Cl. .............. 156/308; 117/47 A; 156/307; 156/309; 156/316; 162/146; 260/79.5 NV; 260/75 T; 428/458; 428/461; 428/483; 428/474; 428/516; 428/513
[51] Int. Cl. ............................................... C09j 5/02
[58] Field of Search ........... 156/307, 309, 308, 316; 117/47 A; 161/411; 162/146; 260/79.5 NV

[56] References Cited
UNITED STATES PATENTS

| | | | |
|---|---|---|---|
| 3,322,593 | 5/1967 | Conti | 156/307 |
| 3,536,556 | 10/1970 | Stevenson | 156/307 |
| 3,540,966 | 11/1970 | Baker | 156/307 |
| 3,573,133 | 7/1969 | Harris | 156/307 |
| 3,647,591 | 3/1972 | Morris | 156/307 X |
| 3,676,244 | 7/1972 | Kim | 156/307 X |
| 3,705,068 | 12/1972 | Dobo | 156/307 X |

*Primary Examiner*—George F. Lesmes
*Assistant Examiner*—Ellis P. Robinson
*Attorney, Agent, or Firm*—Lawrence I. Field

[57] ABSTRACT

Non-cellulosic, synthetic polymeric materials are made bondable to themselves and to other materials, without the use of external binders or temperatures at the melting point of the polymer, by treating the surface with certain chemicals such that after the removal of these chemicals, a water-induced bonding of these materials can be effected. The specific polymers include the polyolefins, polyamides, polyesters and polyacrylics. The preferred treatment is one involving sulphating/sulfonation and oxidation.

25 Claims, 7 Drawing Figures

FIGURE 1.
Treatment Time vs. Peel Strength

Figure 2.

Surface Renewal
Vs.
Treatment Temperature

DFDY Polyethylene

FIGURE 7

V DENOTES MIX WITH GROUNDWOOD PULP
* DENOTES MIX WITH KRAFT PULP

Bonding of APPF.

Figure 3.
Effect of Treatment Time.

Figure 4.
Effect of Bonding Temperature.

Figure 5.
Effect of Bonding Pressure

Figure 6.
Effect of Fiber Length

BONDING OF POLYMERS BY SURFACE ACTIVATION

BACKGROUND OF THE INVENTION

1. Field of the Invention

This invention relates to a method for rendering non-cellulosic synthetic polymeric surfaces bondable to themselves and to other polymeric surfaces. More specifically, it relates to a method of producing film laminates and non-woven fabrics from polyolefin, polyamide, polyester and polyacrylic films and fibers without the use of adhesives or temperatures as high as the melting point of the polymer and to novel products produced by such a method.

2. Description of the Prior Art

Synthetic polymeric surfaces have in the past been bonded together by the use of external binders or adhesives or by softening the surfaces with heat, solvent, plasticizer or by using the polymer in a gel form and then subjecting the surfaces to pressure and/or drying while they were in an adhesive, softened or gel state.

It is also known to treat certain polymeric surfaces with chemicals such as chrome-sulfuric acid, sulfur trioxide and the like in order to make these surfaces more receptive or retentive to various adhesives, dyes, printing inks and coating solutions.

Canadian Pat. No. 796,691 for example, discloses that when a polyethylene surface is subjected to the action of a sulfuric acid-dichromate solution, the treated surface is more retentive to a (solution) coating of vinylidene chloride as well as to printing inks, various adhesives and other coating solutions.

U.S. Pat. No. 2,400,720 also discloses that treatment of polystyrene surface with fuming sulfuric acid made the surface more receptive to dyeing and treatment of a cast phenol formaldehyde plastic surface with liquid chloro-sulfonic acid made the surface more retentive of the glue normally used to bond the surface to a wooden panel.

U.S. Pat. No. 3,592,724 discloses that when polystyrene or polyethylene surfaces are sulfonated with sulfur trioxide gas improved adhesion to certain cementitious materials is obtained.

U.S. Pat. No. 3,558,429 discloses a process for preparing a dry, non-woven fibrous sheet from a self-bonding network of gel fibers of a thermoplastic, fiber forming polymer of acrylonitrile.

Ever since paper was invented it has been known that natural polymers, such as a cellulose or ligno/cellulose in the form of wood fibers for example, are, after certain mechanical and/or chemical treatments, susceptible to water-induced selfbonding. In recent years, U.S. Pat. No. 3,554,825 discloses how certain chemically modified or regenerated celluloses, which are normally not self-bonding, can, by treatment with ozone, be made to be self-bonding.

SUMMARY OF INVENTION

However, no where in the above prior art has it been demonstrated that synthetic non-cellulosic polymer structures, for example, polyolefin, polyamide, polyester and polyacrylic films and fibers can, after surface treatment, be made to bond to themselves or to other polymeric structures merely by the introduction of water and the application of low to moderate pressure and temperatures below the melting point of the polymer.

One object of the present invention is to provide such a water-induced bonding of these structures and thereby render these polymers useful and adaptable to present conventional equipment for forming film laminates and various non-woven fabrics, in particular, that type of equipment which uses water-laid processes for forming fibrous non-woven webs.

Thus, it has surprisingly now been found that when the surfaces of certain non-cellulosic polymeric film or fibers are subjected to known treatments, these film or fibers can be made to bond to themselves or to other polymer films or fibers to form film laminates or fiber networks by first removing the treatment materials, pressing the treated surfaces against other treated surfaces (or untreated surfaces) in the presence of water (or similar amphiprotic solvent) and under the influence of low to moderate pressure and temperatures below the melting point of the treated polymer, removing the excess water by pressing and/or drying and recovering the resulting laminate or fiber network.

Bonding at these lower temperatures has made it possible to bond temperature-sensitive structures together; oriented polymeric films or fibers are an example of such structures. It is to be noted that prior art bonding using temperatures at or near the melting point of the polymer usually results in distorted composite structures; the present invention eliminates this problem. Since adhesives are not required for bonding, this has allowed composite structures to be formed which are independent of the properties inherent in such adhesives.

It has further been found that certain of these treated surfaces can be dried to low moisture contents and stored for substantial periods of time, following which, the surfaces can be reactivated for bonding purposes simply by treating them with water, preferably in the form of steam or water-vapour.

In addition, it has been found, for example:

a. that these surface treatments substantially increased the opacity of certain polymeric surfaces such as those of the polyamides (nylon) and the polyacrylics;

b. that the treated fibers not only formed useful bonds, but also exhibited a substantially improved ability to disperse and form uniform fibrous networks when wetlaid from dilute aqueous suspensions;

c. that synergistic effects occurred when the treated fibers were combined in specific proportions with other conventional fibers to form fibrous networks.

While many of the known surface treatments have been found useful in this invention, the preferred treatments involve a combination of oxidation, sulphation and/or sulphonation. Such preferred treatments include the use of 1. chromo-sulphuric acid, or
2. fuming sulphuric acid (oleum), or
3. sulphur trioxide, or
4. chloro-sulphuric acid.

The chemical chosen will depend on the polymeric surface being treated and the treatment conditions and results desired. Similarly, the amount of water, contact time, temperature and pressure used for bonding will determine to a large extent the strength of the bond and these in turn will depend on the type of equipment available for carrying out the bonding steps.

Thus, besides the above object, it is a further object of this invention to provide a method of producing film laminates and non-woven fibrous webs or fabrics without use of adhesives or temperatures as high as the melting point of film or fiber and thereby avoid the disadvantages that their use incurs.

Other objects and advantages of the present invention and their means of attainment will be apparent from the following description and accompanying examples.

DETAILED DESCRIPTION

DEFINITIONS

Treatments a. Chrome-Sulphuric Acid (CSA)

Various grades of commercially available films (or fibers) were treated by dipping or moving the film (or fibers) into/through the solution for the desired length of time and temperature. Alternatively, the solution could be coating on the surfaces and heated by infrared or other means. The surfaces were then washed with water to remove the solution and then stored either wet or dry prior to bonding.

The Chrome-Sulphuric Acid contained (parts by weight) the following: 1 part potassium dichromate; 1.5 parts water; 18.4 parts concentrated sulfuric acid (95.5 – 96.5%) (potassium dichromate can be replaced by equimolar amounts of the sodium or ammonium dichromate salts or other chromates or chromium trioxide.

b. Fuming Sulphuric Acid (oleum)

Fibers (or films) were added to the oleum and left, with occasional stirring, for the desired time and temperature. Fibers were then filtered off (or film removed) and surfaces washed first with concentrated sulfuric acid, then with 50% sulfuric acid and finally with water; the fibers (or film) is then stored in water prior to use. The ratio of polymer to oleum was approximately 10 grams fiber polymers per 120 ml of oleum. The staged washing with acid prevents fiber shrinkage. The ratio used was for demonstration purposes; higher ratios can be used. Concentrated sulfuric acid containing sulfur trioxide in range of 10 – 30% was generally used. Treatments at room temperature were difficult if the sulfur trioxide content dropped below 5%.

c. Sulfur Trioxide Gas ($SO_3$)

The sulfur trioxide gas used to treat the various polymers was obtained by sweeping a stream of nitrogen ($N_2$) gas through a bottle containing liquid sulfur trioxide (manufactured by Allied Chemical Corp. and sold under the trade name Sulfan); the $N_2$ — $SO_3$ mixture was then passed over/mixed with the polymer in a suitable vessel.

d. Sulfur Trioxide in an Organic Solvent

Liquid sulfur trioxide (e.g. Sulfan — see above) was dissolved in an organic solvent and solution used to treat the polymer.

Bonding Procedures

Very Low Pressure — Activated surface(s) placed face to face very wet; excess water removed with a squeeze roll; film laminate then placed between blotting paper and glass plates.

Higher Pressures were obtained either by use of a Carver press, or heat sealing equipment or calender rolls and Temperatures and Contact Times were regulated by the equipment used.

Non-Woven Web Formation

Synthetic fibers alone or with wood pulp were mixed in a laboratory blender and standard pulp and paper procedures were used except that the sheet was removed from the forming wire by hand. Water was removed by squeezing with a rubber roll to the desired water content. The sheets were then subjected to the desired bonding pressure and temperature as indicated above.

Test Values

Peel Strength — film laminate separated at 90° angle at a rate of 10 inches per minute; results expressed as pounds per linear inch (p.l.i.) at the temperature used (unless stated otherwise this is room temperature of 70° F.).

| Dry Tensile and Stretch | —TAPPI T-404 and T-457 | |
|---|---|---|
| Tear Tensile | —TAPPI T-456 | TAPPI — Technical Ass. Pulp |
| Porosity | —Bendtsen Method | & Paper Industry. |
| Brightness | —Elrepho Method | |
| Opacity | —TAPPI T-425 | |

In the attached drawings

POLYOLEFINS a. Polyethylene, low density (LDPE)

i. Chrome - sulfuric acid

EXAMPLE 1

Self-Bonding

Figure 1:
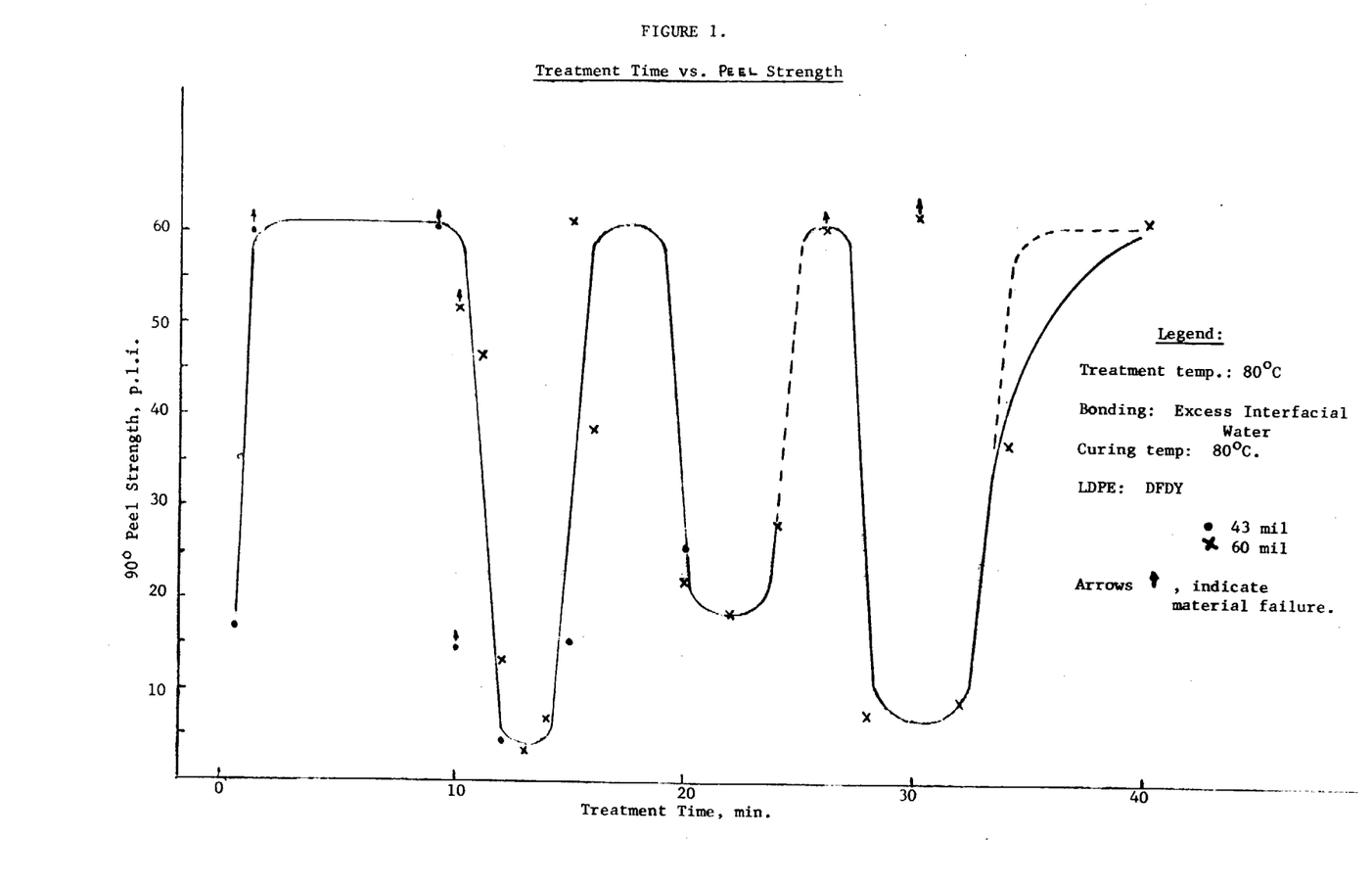
FIG. 1 is a graph showing the treatment time versus the peel strength of certain products of the present invention.

A grade of LDPE (Union Carbide DFDY) film was solution treated with chrome-sulfuric acid and subjected to self-bonding (treated surface pressed against treated surface). The conditions and results are shwon in FIG. 1 and utilize very low pressures and excess interfacial water. As shown in FIG. 1, a peel strength of 60 p.l.i. is already reached at between 30 to 60 seconds treatment at 80°C. After approximately 11 minutes the bond strength falls off and increases again at 15 to 16 minutes treatment. This surface renewal or ablation continues in cyclic fashion with time. In summary, the bond strength of a low density polyethylene for different treatment temperatures is shown in Table I. At a treatment temperature of 80°C. and for peel strengths below 60 p.l.i., the peel strength of LDPE film can be estimated by multiplying the treatment time in seconds by 1.2.

TABLE I

Strength for Different Treatments Temperatures

| Treatments | | | |
|---|---|---|---|
| Temperature | 25°C | 60°C | 80°C |
| Time - | 2.0 4.5 6.0 7.5 | 15 26 35 46 50 | 5 10 30 60 |
| | Hours | Minutes | Seconds |
| Peel Strength | 10 18 26 4 | 48 26 17 25 10 | 65>14 35>60 |

In general, it has been found that bond strength depends on surface treatment and subsequent bonding conditions particularly, pressure and that higher surface treatments allow the use of milder bonding conditions.

On the other hand, higher treatment times and/or temperatures can result in discoloration. The preferred surface treatment for LDPE is between 2 to 15 seconds at temperatures near 90°C.

Visible wet surfaces can be bonded using very low bonding pressure (e.g. 0.1 psi) but at higher contact times; drier surfaces require higher bonding pressures; bonding temperatures can be substituted for these higher bonding pressures. In general, a peel strength of less than 12 p.l.i. is of commercial interest and for most laminates and paper reinforcements, a peel strength of only 1 to 3 p.l.i. is required. These values can be obtained by the process of the present invention with very short treatment times with no discoloration whatsoever and the use of commercially viable bonding conditions. Bonds of higher than 6 p.l.i. peel strength have been found to have excellent resistance to cold temperatures.

Figure 2:
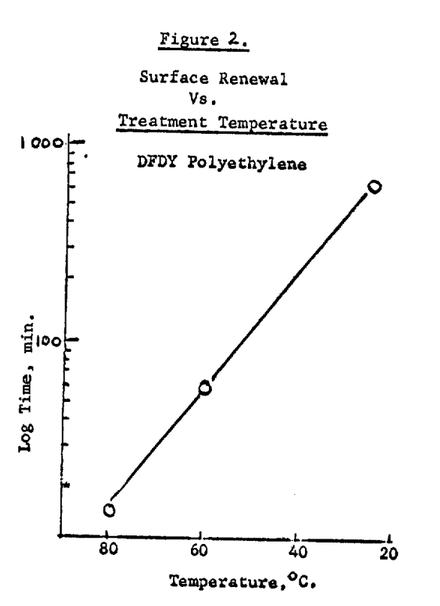
FIG. 2 is a graph showing the results of the surface renewal versus treatment temperature.

It has been found that the depth of treatment may influence the bond strength in that interdiffusion of polymer chains will be effected to a greater depth. Also, from the graph of FIG. 2, based on results obtained from several experiments, it appears that there is a linear, semi-logarithmic relationship between treatment time (i.e. time to first surface renewal) and treatment temperatures. Thus FIG. 2 also indicates an estimation for the treatment time to optimum bond strength for any given temperature. For example, one could expect top bond strength and no surface oblation for 100 minutes at a treatment temperature of 52°C.

It has been found that the surface treated film (or fibers) can be stored for long periods of time without substantial loss in the bondability of the surface. This is particularly true if the surfaces are not over dried (e.g. vacuum dried). In general the drier the treated surface during storage, the longer the time to reactivate with water and/or the higher the required bonding temperature and/or pressure to reach the desired bond strength.

EXAMPLE 2

Bonding to other films

LDPE film (or fiber) was surface treated with chromesulfuric acid solution and the treated surface pressed against an untreated surface of various other films (or fibers) using water as the bonding agent. Results are shown in the Table below.

A 6 mil film was used for evaluation purposes; usually 1 to 2 mil films are used in commercial laminates.

Films (or fibers) which were difficult to bond to treated LDPE could be rendered more bondable by surface treatment. For example, high density polyethylene, polypropylene and polystyrene bonded to a treated LDPE surface after its surface was treated with chrome-sulfuric acid. In the case of metals, such as aluminum, treatment of the metal surface with the chrome-sulfuric acid improved its bondability to treated LDPE. Teflon surfaces which have been activated are bondable with water to treated PE surfaces.

Composite laminates of the above type are very useful commercially due to a useful combination of film properties.

EXAMPLE 3

Modifications

It has also been found that the treated surfaces can be further treated with other substances to give improved properties to the laminate formed with the film in which water is the main bonding agent.

It has been found for example that bonds of higher clarity (plus slightly higher bond strengths) can be formed if the PE surface is washed with an aqueous solution of small amounts of water soluble plasticizers (e.g. 0.05% solution of polypropylene glycol (425 or 1025, Union Carbide grade) or glycerin or ethylene glycol); concentration of over 0.2% lowers the bond strength).

By adding polyvinyl alcohol (PVA) to the last wash water, enough PVA can be added to the laminating surface(s) to give them some PVA properties e.g. grease or oil resistance. Similar results could be obtained with polyvinylchloride. Dyes in the wash water would add colour to the laminate. Antioxidants, inhibitors etc. would increase resistance to weathering (degradation etc.).

EXAMPLE 4

Water Resistance

The above water-induced bonds can be made resistance to cold and hot water by merely varying the treatment and/or bonding conditions.

The Table lists the resistance of bonds prepared at various treatment times and bonding conditions. The sample was a DFDY grade of PE, five-eighths of an inch wide, 10 mil thick. Samples were tested directly after removal from the water bath.

TABLE

Bonding of Activated Polyethylene to Other Polymers

| Film | | Treatment of PE Temp.°C | Time, sec. | Laminate Strength p.l.i. |
|---|---|---|---|---|
| Ionomer | (Surlyn) | 80 | 15 | 2.0 Del. |
| | | | 60 | 6.3 FF |
| Nylon-6 | (Capran C) | 80 | 15 | 0.7 Del. |
| | | | 60 | 1.4 Del. |
| Polyester | (Mylar) | 80 | 15 | 1.4 FF |
| Polyacrylic | (Korad C) | 80 | 15 | 0.8 Del. |
| | | | 60 | 1.1 Del. |
| Cellophane | | | 15 | 1.0 Del. |
| | | | 60 | 1.1 FF |
| Polyvinyl Alcohol | (Mono Sol) | 80 | 15 | 0.8 Del. |
| Aluminum Foil | | 80 | 15 | 0.4 |
| | | | 60 | 1.7 |
| Paper | | 80 | 15 | FF |

Del. = Delamination FF = Film Failure
6 mil film (DFDY - Union Carbide) - Bonding at 80°C using excess water and low pressure.

TABLE

| Treatment | | Bonding | | Resistance to Water | | Immersion Time | | Peel Strength |
|---|---|---|---|---|---|---|---|---|
| Temp. °C | Time sec. | Temp. °C | Time(1) hrs. | Water Temp. °C | | min. | hrs. | p.l.i. |
| 80 | 5 | 25 | 24 | 100 | | 30 | | 0 |
|  |  | 75 | 65 | 100 | | 30 | | 0.3 |
|  |  |  |  |  | | 60 | | 0.2 |
| 80 | 15 | 25 | 24 | 25 | | | 72 | 0 |
|  |  |  |  | 100 | | 30 | | 0 |
|  |  | 75 | 4 | 25 | | | 72 | 0.4 |
|  |  |  |  | 100 | | 30 | | 1.3 |
|  |  |  |  |  | | 120 | | 1.1 |
|  |  |  |  |  | | 420 | | 0.5 |
|  |  |  | 24 | 25 | | | 72 | 8.5 |
|  |  |  |  | 100 | | 120 | | FF |
|  |  |  |  | 100 | | 420 | | 0.4 |
| 80 | 60 | 25 | 24 | 100 | | 30 | | 3.9 |
|  |  |  |  |  | | 120 | | 2.3 |
|  |  |  |  |  | | 180 | | 1.9 |
|  |  | 75 | 4 | 100 | | 90 | | FF |
|  |  |  |  |  | | 360 | | 2.1 |
|  |  |  | 24 | 100 | | 360 | | 2.8 |
| 80 | 300 | 75 | 24 | 100 | | 420 | | 7.4 |

(1) very low pressure.

The bond strength of all samples remained unchanged after 72 hours at 14°F and testing at that temperature. Bonded films, even the ones showing zero strength do not float apart but cling to each other and if allowed to dry out will rebond and result in good bond strength again. In fact under certain circumstances, the peel strength immediately after immersion can be greater than before (e.g. treatment at 25°C and 660 seconds, and immersion at 25°C per 24 hours).

Extreme resistance to boiling can also be obtained by bonding activated surfaces under high pressure. For instance, bonds prepared from polyethylene (activated at 80°C for 10 seconds and longer) and using a calendar roll pressure of 300 p.s.i., resulted in film failure after boiling in water for 6 hours.

ii. Fuming Sulfuric Acid (oleum)

LDPE surfaces are also treatable with oleum. However, the reaction is more severe and much lower treatment times have to be used and in general lower bond strengths were obtained.

iii. Other treatments and combinations

LDPE surfaces were found to be also treatable with a number of other chemicals (which are mentioned below).

Since the bonding of LDPE generally requires less severe bonding conditions than that for polypropylene, nylon etc., film or fibers could be made from these more difficult to bond materials in which a high percentage of LDPE would be present on the surfaces of these films or fibers. A 0.1 mil film of LDPE on such a fiber of film was found to be sufficient for good bonding.

b. Polyethylene, higher densities (and orientated)

i. Chrome-sulfuric acid

EXAMPLE 5

Self-Bonding

Similar procedures to those described with respect to LDPE were repeated using polyethylene of various densities and melt indices. The results are shown on the accompanying Table.

TABLE

Influence of Physical Properties on Bonding Conditions

| Trade Name | Density g/cm³ | Melt Index g/10 min. | Treatment Time at 80°C | Peel Strength p.l.i. |
|---|---|---|---|---|
| DFDY | 0.923 | 4.5 | 5 secs | 6.5 |
|  |  |  | 10 secs | 14.0 |
|  |  |  | 30 secs | 35.0 |
| DYNK-2 | 0.922 | 0.2 | 5 secs | 14.2 |
|  |  |  | 10 secs | 14.4 |
|  |  |  | 30 secs | 14.4 |
| Dylan 1000F | 0.918 | 0.24 | 2 secs | 0.9 |
|  |  |  | 5 secs | 7.6 |
|  |  |  | 8 secs | 15.5 |
| Dylan 1020F | 0.917 | 2.0 | 2 secs | 4.4 |
|  |  |  | 5 secs | 13.4 |
|  |  |  | 8 secs | 20.6 |
| Dylan 2080F | 0.922 | 6.0 | 2 secs | 6.3 |
|  |  |  | 5 secs | 9.9 |
|  |  |  | 8 secs | 20.6 |
| Super Dylan 4002F | 0.939 | 0.38 | 10 secs | 0.7 |
|  |  |  | 20 secs | 1.4 |
|  |  |  | 30 secs | 6.9 |
| Super Dylan 7002F | 0.964 | 0.24 | 2 mins | 4.9 |
|  |  |  | 5 mins | 3.5 |
|  |  |  | 10 mins | 7.3 |
| MPE 200 | 0.950 | 0.25 | 10 mins | 0.3 |
|  |  |  | 15 mins | 1.3 |
|  |  |  | 30 mins | 1.3 |
| MPE 500 | 0.960 | 0.20 | 2 mins | 1.3 |
|  |  |  | 10 mins | 1.4 |
|  |  |  | 30 mins | 3.5 |
| MPE 720 | 0.962 | 6.0 | 2 mins | 4.9 |
|  |  |  | 5 mins | 6.8 |
|  |  |  | 10 mins | 9.1 |
| MPE 770 | 0.962 | 18.0 | 2 mins | 7.2 |
|  |  |  | 5 mins | >15.5 |
|  |  |  | 10 mins | >14.6 |
| DuPont | 0.960 | 18.0 | 2 mins | 0.1 |
|  |  |  | 5 mins | 2.2 |
|  |  |  | 15 mins | >4.2 |
|  |  |  | 40 mins | — |
| Chemplex | 0.960 | — | 100° 60 secs | pale yellow 1.2 |
|  |  |  | 110° 15 secs | brown 2.5 |
|  |  |  | 30 secs | brown >2.5 |

TABLE-continued

| Trade Name | Influence of Physical Properties on Bonding Conditions | | | Peel Strength p.l.i. |
|---|---|---|---|---|
| | Density g/cm³ | Melt Index g/10 min. | Treatment Time at 80°C | |
| Hostalen | 0.955 | 0.35 | 80° 40 mins | — |

From the above, it will be seen that for higher density polyethylene, additional treatment times are normally required, and will depend on different factors inherent with the type of resins.

It has also been found that the activation time, in addition to density and melt index, is also increased by the degree of order in the polymer. For load bearing polymers the order and strength is increased by stretching. A high density film after being stretched to five times its original length required a three times longer surface activation time. At lower stretch ratios, this increase in activation time was not observed. Higher stretch ratios than five could not be investigated due to machine limitations.

EXAMPLE 6

Bonding to Other Films

High density polyethylene can also be bonded to other films, for example, nylon and aluminum foil, using heated calendar rolls.

ii. Sulfur-trioxide

Higher density polyethylenes can also be treated with sulfur-trioxide either as a gas or dissolved in concentrated sulfuric acid (oleum). The method of treatment is similar to that described below for polypropylene. Some values are shown in the following table.

TABLE

| Treatment(1) Time, min. | Bulk g/cm³ | Breaking Length km | Stretch % | Burst Factor | Tear Factor | Opacity % | Brightness % |
|---|---|---|---|---|---|---|---|
| 0 | 1.57 | 0.9 | 3.2 | 7.8 | 88 | 95.0 | 75.1 |
| 5 | 1.88 | 2.4 | 13.2 | 23.2 | 176 | 96.7 | 39.9 |
| 10 | 1.80 | 2.9 | 14.4 | 26.1 | 199 | 93.3 | 29.0 |
| 20 | 1.71 | 2.8 | 16.2 | 27.9 | 171 | 91.0 | 26.7 |

(1)15% Oleum.

c. Polyethylene, foamed

The surface activators and bonding process can also be used on foamed polymers without affecting the properties of the foamed material. Chrome-sulfuric acid (CSA) activation treatment was applied to a sample of LDPE layered foam (trade name: Volasta made by Volltek Inc.) for 30 seconds at 80°C and then washed with water, after partial drying the foamed layer was bonded to paper by pressing it for a short time at 80°C. Paper failure occurred on testing the bond strength.

d. Polyethylene, copolymers and mixtures

Copolymers containing ethylene can be bonded as long as their ethylene content is at least 10% of the composition. This was found out by adding polyethylene to polymers which do not bond on surface activation under the applied conditions. The result of admixed low density polyethylene to high density polyethylene and to polypropylene indicated that the peel strength increased fairly rapidly (from 1 p.l.i. to 16 p.l.i.) as the % of LDPE was increased from 20% to 60%.

Some commercial Elwax resin containing about 28% vinyl acetate in ethylene, can be bonded without problems after surface treatment.

A thermoplastic rubber consisting of a 1 to 1 mixture of LDPE and a butadiene/styrene block copolymer resulted in a peel strength of 2.9 p.l.i. after a surface activation of 5 seconds at 80°C.

e. Polypropylene (PP)

i. Fuming Sulfuric Acid (oleum)

Polypropylene surfaces, not sufficiently treatable with chrome sulfuric acid, were found to be treatable with fuming sulfuric acid. This is probably the result of sulfonation reactions predominating over those of sulfation.

While the reaction rates are higher with an increasing percentage of $SO_3$ in the acid (in the range 4 to 30%), the yield decreases slightly. While the bonding level is higher for higher $SO_3$ concentrations, for convenience most of the results reported here were obtained using oleum containing about 15% $SO_3$. PP Fibers treated with oleum with 20% $SO_3$, for example, gave breaking lengths of over 8 kg and tear factors over 800 and is usually a preferred concentration.

Prolonged treatment cause discoloration (white to yellow to brown) particularly with certain polymer grades (e.g. that of Phillips Fiber Corp.). On the other hand bond strength generally increased with discoloration/loss in brightness. Generally the preferred treatment is 25 – 30 minutes at a temperature of approximately 32°C and 20% oleum.

The treated fibers dispersed well in water and mixed readily with conventional wood pulp fibers without separating on storage. Fast uncontrolled reaction conditions tend to promote low dispersibility of the final fibers.

Variations in the above results were obtained when using PP fibers from different manufacturing sources and in some cases, while one property may be down another may be up. Proper choice/blending will yield the desired results. When using oriented polymers, in general, the lower the orientation/draw ratio (and the melt index) the better the bonding.

$SO_3$ consumption by the PP fibers lay in the range of 6 to 20% (usually about 10%) based on fiber weight.

EXAMPLE 7

PP Fibers

PP fibers of various sizes were treated (as described above) with oleum (14% $SO_3$) for various times and bonding pressures and temperatures and made in nonwoven webs/sheets. These sheets were tested for various physical properties using standard pulp and paper (TAPPI) procedures. The bonding was done both under prolonged pressure (e.g. Carver press) and short-duration pressure (e.g. calendar rolls). Best bonding was obtained when the initial web moisture (prior to applying bonding pressures) was in the range of 20 to 30%; higher moistures require longer bonding/drying times.

Thus, the results shown in the following Figures, except where the Figures indicate a variation, the following conditions were used: Treatment temperature — 25°C; Treatment Time — 45 minutes; Bonding Time — 20 minutes; Bonding Pressure — 660 psi; Bonding Temperature — 125°C. Fiber length — one-fourth inch; Fiber denier — 3; Moisture Content of web — 25%; Basis weight — 36.8 lbs/ream (60 g/m$^2$).

Figure 3:
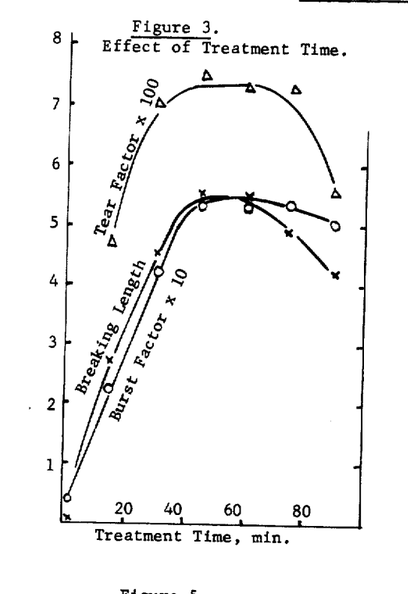
FIGS. 3 through 6 are similar graphs showing the values obtained for different products relating to certain variables in the processing conditions.

FIG. 3 illustrates the effect of Treatment time on Tear Factor, Breaking length (Tensile) and Burst Factor. % Stretch increases curvilinearly reaching approximately 10% after 90 min. Fiber tensile (zero-spantest) remained at a maximum for treatment times up to 90 mins. (this was also the case for the results given below).

Figure 4:
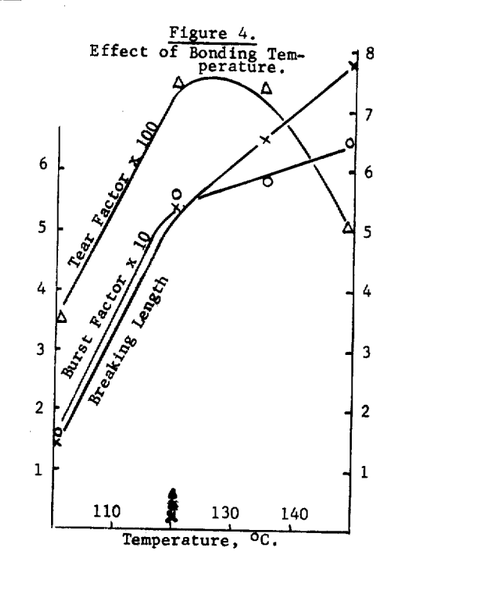

FIG. 4 illustrates the effect of Bonding Temperature. At 150°C severe fiber shrinkage takes place if long periods are used. % stretch increased linearly with Temperature. Brightness decreases with temperature. The points near the X-axis are those for untreated fibers.

Figure 5:
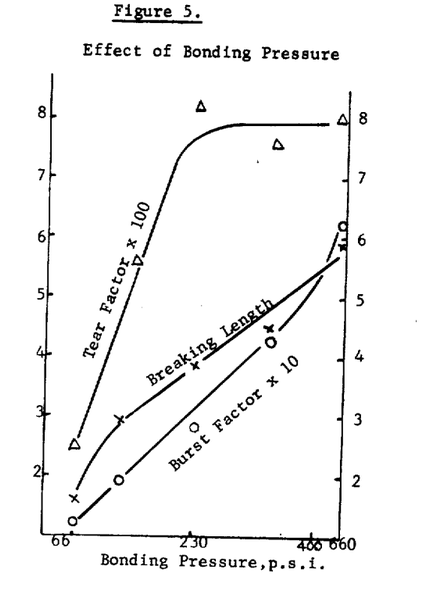
Figure 6:
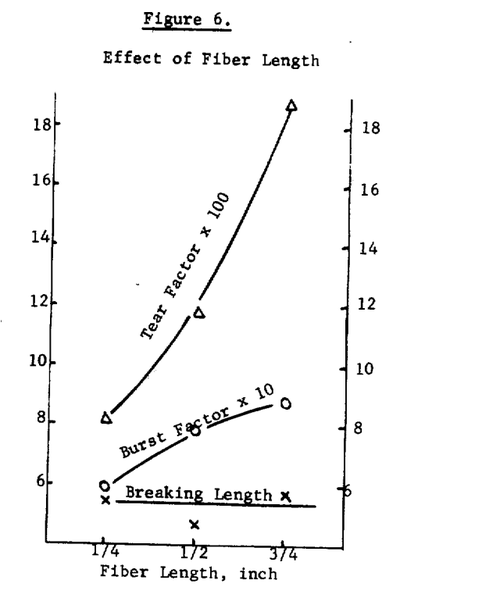

FIG. 5 illustrates the effect of Bonding Pressure and FIG. 6 the effect of Fiber Length. All properties decrease with increasing fiber denier indicating that number of bonds is more important than bonding area; this is illustrated in the following table:

TABLE

| Influence of Fiber Denier on Web Properties | | | |
|---|---|---|---|
| | 3d | 6d | 10d |
| Breaking Length, km | 5.94 | 3.34 | 3.20 |
| Burst Factor | 62.4 | 30.1 | 28.2 |
| Tear Factor | 800 | 700 | 410 |

This suggests that use of split/fibrillated fibers should lead to greater web strength for a given basis weight.

Bonding times are largely connected with rate of drying when long periods are involved. A long period was used in the above investigation to ensure proper drying at all temperatures; this, however, tended to give lower strength values at the higher temperatures as results at these temperatures indicated that higher values could be obtained with much less bonding time. Calendar roll results (involving times in the order of one second at 150°C and 500 psi pressure) indicated, however, that very low bonding times gave relatively low bond strengths, e.g. breaking lengths of 3 km. Rapid drying techniques at temperatures below the melting point of the polymers would produce relatively high strength values for bonding times subtantially less than 60 seconds at high bonding pressures (500 psi and higher) steadily applied over the period. Rapid drying would be particularly important for the higher basis weight sheets where the inner layers take longer to dry.

Webs formed from treated PP fibers were found to be very resistant to acids, alkalines and most common solvents and oils (after six day exposure little change to the tensile strength or brightness was observed). Oxidizing media (e.g. ultra-violet radiation, chlorine, hydrogen peroxide), however, lowered the strength approximately 50% after a one-day exposure; the brightness on the other hand improved substantially.

Comparison of the above treated webs with those made from non-treated fibers and conventional adhesives showed the former to be much superior in strength. Also use of treated fibers with adhesives gave higher strengths than that with untreated fibers (with adhesives) but still lower than the above treated fiber webs.

EXAMPLE 8

Mixtures with wood pulps

Prior art attempts to add synthetic fibers to natural wood pulp fibers have generally been unsuccessful; usually the fibers did not mix well, formation was poor and very low strengths were obtained. This was confirmed when untreated PP fibers were blended with various types of pulps. For example, breaking length (and burst factor) decreased steadily to the almost no strength value for the 100% untreated fiber sheet. Tear values rose slightly before falling off when weak wood pulps were used and rose more markedly with stronger pulps (before falling off). Bulk values (and porosity) remained very high indicating lack of bonding.

Figure 7:
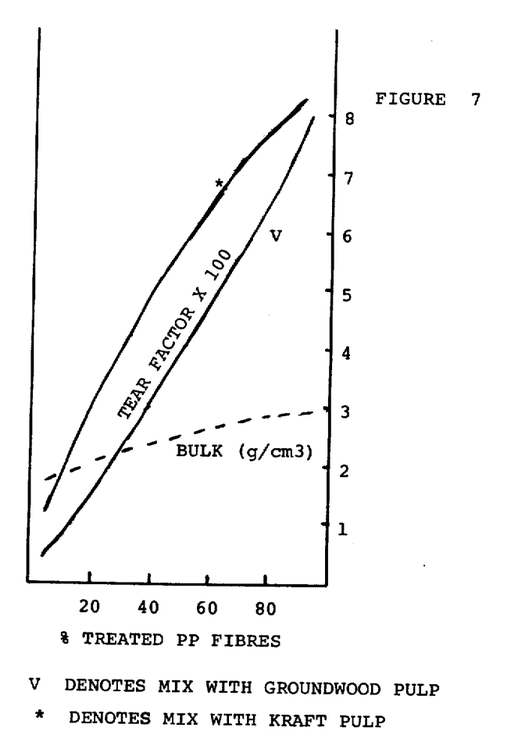
FIG. 7 is a further graph showing the tear factor for certain products.

Treated PP fibers on the other hand behaved much more successfully. Dispersibility and uniformity of web formation improved substantially. Where the breaking length or Tensile (and burst) of the wood pulp was substantially lower than that of the PP pulp (e.g. 2 – 3 times lower) the addition of the PP increased the strength slowly to where about 70% of the mix was PP, then the strength increased rapidly to the value for the 100% PP. For wood pulp webs which were nearly as strong or stronger than the PP webs, on addition of PP, the strength fell off to the 70% addition level and then rose rapidly as before. Tear (and bulk) on the other hand, generally increased linearly for all pulps with increasing amounts of PP. This is shown in FIG. 7. Porosity generally increases quite rapidly with addition of the PP fiber.

Thus, where tear and porosity are important properties for the final product the use of treated PP fibers would be very advantageous (e.g. in manufacture of filters and certain grades of paper). The addition of conventional wet strength additives would improve the wet properties of the wood pulp and consequently that of the final web. Conventional wood pulp bleaching processes could be used to improve the brightness of the treated PP fibers. For similar requirements, other types of treated synthetic fibers can be used in mixtures with wood pulps (e.g. chrome-sulfuric acid treated polyethylene and/or nylon fibers; sulfur trioxide-treated PP fibers; etc.).

EXAMPLE 9

Mixtures with other fibers

Another fiber which gave good results when blended with treated PP fibers was that made from polyvinyl alcohol (PVA) especially the more water soluble grades of PVA. In fact it was found that a mixture of PP (treated with oleum) fibers and soluble PVA fibers gave rise to a synergistic effect in that as the % of PVA fibers increased the breaking length (tensile) and the bursting strength of the mixed web increased to a maximum (i.e., 50 – 70% higher than that for 100% PP web) until the mixture contained approximately 25% PVA fibers, thereafter the tensile and burst decreased gradually to the low tensile value of the 100% PVA web. The Tear strength steadily decreased (more quickly at first) to the very low values of the 100% PVA web. The PVA fiber used in the above was a grade made by Kurashiki Rayon Co. Ltd. and sold under the name of Kuralon (soluble at 80°C fibers 4 mm long). No synergism was found when a fully insoluble grade of PVA was used.

These treated PP/soluble PVA fiber mixtures compared very favourably with conventional spun bonded fabrics except for tear strength; however, use of longer fibered PP tended to remedy this. It is to be noted that these mixtures require much shorter bonding times and lower bonding temperatures (e.g. 100° – 120°C) than do the 100% treated PP webs; bonding pressures too can be much lower. Prolonged heating lowers the strength so that these mixtures are very amenable to heated calendar roll bonding techniques, e.g. bonding at 120°C and 100 psi and initial moisture content of 50% yielded the following dry web properties (for a mixture containing 25% PVA fibers): Breaking length (tensile) — 13.6 kg; % Stretch — 25; Burst factor 148.7; tear factor 388; porosity 10,000 ml/min. Such fiber mixtures would be more amenable to conventional paper making processes.

A reverse synergism was found to take place when rayon (modified cellulose e.g. cellulose acetate) fibers were mixed with treated PP fibers in that the tensile and burst decreased to a minimum and then rose to the value for 100% rayon web. Tear decrease was similar to that for the PVA fibers.

Acrylonitrile fibers tended to yield results similar to the PVA fibers. Polyester fiber mixtures were not promising although treating the polyester with sodium hydroxide gave higher tensile values.

Ternary fiber mixtures were also investigated. The following Table shows results of blending natural polymer fibers (kraft pulp) with treated PP fibers (APPF) and soluble polyvinyl alcohol fibers (PVAF).

TABLE

Strength Properties of Ternary Fiber Mixtures Kraft/APPF/PVAF

| % Kraft | Amount APPF | PVAF | Breaking Length km | Tear Factor | Burst Factor | Bulk g/cm³ | Opacity % | Porosity ml/min |
|---|---|---|---|---|---|---|---|---|
| 100 | — | — | 5.09 | 154 | 34.6 | 1.62 | 69.4 | 322 |
| — | 75 | 25 | 11.46 | 206 | 73.7 | 2.66 | 50.0 | 10400 |
| — | 100 | — | 5.94 | 800 | 62.4 | — | 85.0 | — |
| — | — | 100 | 2.86 | 104 | 14.1 | 1.55 | — | — |
| 83.5 | 8.4 | 8.4 | 6.81 | 130 | 41.4 | 1.53 | 61.8 | 540 |
| 77.0 | 15.4 | 7.7 | 6.74 | 170 | 40.2 | 1.58 | 65.5 | 665 |
| 77.0 | 7.7 | 15.4 | 7.99 | 81 | 41.5 | 1.45 | 59.8 | 540 |
| 71.5 | 14.3 | 14.3 | 7.44 | 151 | 47.7 | 1.64 | 60.5 | 805 |
| 66.8 | 16.7 | 16.7 | 7.41 | 150 | 47.3 | 1.73 | 60.0 | 1000 |
| 60.0 | 20.0 | 20.0 | 4.60 | 162 | 38.4 | 1.66 | 64.3 | 1214 |
| 44.4 | 27.8 | 27.8 | 8.03 | 111 | 39.7 | 1.64 | 44.7 | 1960 |
| 57.2 | 28.1 | 14.3 | 6.83 | 213 | 44.1 | 1.80 | 62.0 | 2350 |
| 50.0 | 25.0 | 25.0 | 8.89 | 226 | 51.1 | 1.68 | 47.5· | 1975 |
| 43.0 | 28.5 | 28.5 | 7.98 | 112 | 46.8 | 1.74 | 45.3 | 2366 |
| 40.0 | 40.0 | 20.0 | 7.01 | 185 | 43.0 | 1.80 | 54.8 | 2900 |
| 40.0 | 30.0 | 30.0 | 6.96 | 137 | 41.0 | 1.71 | 43.5 | 2500 |
| 33.3 | 33.3 | 33.3 | 7.13 | 156 | 49.8 | 1.76 | 38.0 | 2350 |

APPF = Treated PP Fibers
PVAF = Polyvinyl Alcohol Fiber

Again synergism is shown with the maximum tensile being reached with a mixture containing 50% Kraft — 25% APPF and 25% PVAF. While the tensile is not as high as the 75 APPF plus 25 PVAF, it is higher than that for each of the fibers separately.

There are a few synthetic pulps on the market which are made especially for use in making non-woven webs, however, as previously mentioned, even these still yield webs of low tensile strength especially when used with conventional paper making processes.

One such pulp contains high density polyethylene (HPPE) fibers and it has been found that if these fibers are bonded together at temperatures closer to their melting point the tensile strength and % stretch not only increases but the opacity drops substantially e.g. with bonding at approximately 118°C. (200 psi), the tensile is 4, % stretch 12, % opacity 81 while bonding at 138°C. (200 psi) these values are respectively 9.4, 28.3 and 14. However, by adding PP fibers treated for 15 minutes with oleum to these synthetic fibers and bonding at 135°C. the following results were obtained:

| % Treated PP | % HDPE | % Opacity | Tensile p.l.i. | % Stretch | Thickness Mil |
|---|---|---|---|---|---|
| 0 | 100 | 14 | 7.8 | 23.0 | 4.2 |
| 10 | 90 | 27 | 12.0 | 8.8 | 5.5 |
| 30 | 70 | 47 | 29.1 | 23.2 | 6.3 |
| 50 | 50 | 40 | 41.0 | 29.7 | 7.5 |
| 60 | 40 | 70 | 27.2 | 21.0 | 8.4 |

Such an improvement gives a wider choice of web properties (including a range of opacities or transparencies).

ii. Gaseous Sulfur Trioxide

PP fibers were treated at room temperature with a continuous stream of sulfur trioxide and nitrogen gases and after bonding the fibers into a web, the following strength values were obtained:

TABLE

| | Continuous Flow | | | | | | | |
|---|---|---|---|---|---|---|---|---|
| | Approximately 0.5% $SO_3$ in $N_2$ | | | | Approximately 1.5% $SO_3$ in $N_2$ | | | |
| | TREATMENT TIME | | | | | | | |
| | 7 min | 2 min | 5 min | 30 secs | 1 min | 2 min | 3 min | |
| Burst Factor | 11 | 38 | 50 | 65 | 23 | 48 | 51 | 65 |
| Tear Factor | 142 | 486 | 714 | 867 | 393 | 724 | 830 | 786 |
| Breaking Length | 1.4 | 3.3 | 5.0 | (5.5) | 3.4 | 5.3 | 5.7 | 6.6 |
| Stretch % | 3.8 | 9.3 | 13.8 | 15.1 | 6.0 | 11.4 | 14.4 | 18.7 |

As indicated, the treatment time could be reduced and the tensile values increased by using higher concentration of $SO_3$ gas. Similar results were obtained using a batch process.

iii. Sulfur trioxide in an Organic Solvent

Since the use of organic solvents, especially chlorinated solvents, might be advantageous in certain situations the use of such solvents in combination with sulfur trioxide was investigated. It is possible the solvent may prepare the surface for more effective treatment by the chemical agent.

When a methylene chloride solvent containing low percentages of sulfur trioxide liquid (Sulfan) was used to treat PP fibers and the treated fibers bonded into a non-woven web the following strength values were obtained:

| Treatment Temp. | PPF grms | CH₂Cl₂* ml | Treatment Time mins. | Breaking Length km | Burst Factor | Tear Factor |
|---|---|---|---|---|---|---|
| 2-4°C | 1.2 | 100 | 20 | 9.04 | 62.2 | 595 |
| " | " | " | 40 | 9.64 | 64.6 | 577 |
| " | " | " | 70 | 8.84 | 69.0 | 423 |
| " | 2.4 | 100 | 40 | 8.52 | 64.4 | 667 |
| " | " | " | 60 | 9.61 | 56.1 | 546 |
| " | " | " | 80 | 10.00 | 54.3 | 596 |
| " | 1.2 | 100 | 15 | 9.20 | 60.6 | 634 |
| " | " | " | 30 | 9.60 | 61.9 | 499 |
| " | " | " | 45 | 9.30 | 51.1 | 453 |
| " | 2.4 | 100 | 10 | 7.72 | 41.9 | 704 |
| " | " | " | 30 | 6.37 | 44.9 | 457 |
| " | " | " | 50 | 7.70 | 46.2 | 649 |
| " | 1.2 | 100 | 5 | 4.09 | 26.0 | 432 |
| " | " | " | 15 | 7.00 | 48.7 | 618 |
| " | " | " | 30 | 7.84 | 53.2 | 577 |
| " | 2.4 | 100 | 10 | 5.09 | 35.9 | 674 |
| " | " | " | 30 | 6.28 | 38.2 | 579 |
| " | " | " | 50 | 4.60 | 32.6 | 464 |

*Contains 1 ml. of Sulfan

As indicated excellent tensile values were obtained at relatively low temperature treatments.

POLYAMIDES

Nylon

EXAMPLE 10

Self-Bonding

Nylon - 6 treated with chrome-sulfuric acid or with diluted sulfuric acid, was washed with water and the two treated surfaces were brought together while wet, and bonded together using a heat sealer under various bonding conditions. Evaluation of the resulting bonds are shown in the following Table:

TABLE

Treatment and bonding Conditions for Nylon - 6

| Treatment Temp. °C. | Treatment CSA* | Acid H₂SO₄ | Bonding Temp. °C. | Bonding Time mins | Pressure p.s.i. | Peel Strength p.l.i. |
|---|---|---|---|---|---|---|
| 80 | + | | 80 | 3 | 20 | 0.1 |
| | | | 100 | 3 | 20 | 1.2 |
| 80 | + | | 80 | 6 | 20 | 0.7 |
| | | | 100 | 6 | 20 | 1.7 |
| 80 | + | | 80 | 3 | 60 | 0.8 |
| | | | 100 | 3 | 60 | 2.8 |
| 80 | + | | 80 | 6 | 60 | 0.9 |
| | | | 100 | 6 | 60 | 3.7 |
| 60 | + | | 80 | 3 | 20 | 0.2 |
| | | | 100 | 3 | 20 | 2.2 |
| 60 | + | | 80 | 6 | 20 | 0.4 |
| | | | 100 | 6 | 20 | 1.9 |
| 60 | + | | 80 | 3 | 60 | 0.6 |
| | | | 100 | 3 | 60 | 2.6 |
| 60 | + | | 80 | 6 | 60 | 0.8 |
| | | | 100 | 6 | 60 | 3.0 |
| RT | | 40% | 80 | 3 | 20 | 0.1 |
| | | | 100 | 3 | 20 | 0.8 |
| RT | | 40% | 80 | 6 | 20 | 0.1 |
| | | | 100 | 6 | 20 | 0.9 |
| RT | | 40% | 80 | 3 | 60 | 0.1 |
| | | | 100 | 3 | 60 | 1.0 |
| RT | | 40% | 80 | 6 | 60 | 0.2 |
| | | | 100 | 6 | 60 | 1.4 |

*CSA = Chrome Sulfuric Acid
RT = Room Temperature

The water required for bonding is more tightly held on the nylon treated surfaces than on PE treated surfaces; consequently less free water is required for nylon bonding. For example, treated nylon surfaces air-dried for 48 hours still resulted in bondable surfaces.

Bonding times can be reduced by using higher pressures. For example, nylon treated with CSA for 10 secs. at 60°C. was self-bonded, using calender rolls at 100°C. and 225 p.l.i., to a peel strength of 3.6 p.l.i.; at 700 p.l.i. roll pressure the peel was 4.9 p.l.i. Treatment time and temperature (and solution concentration) are more critical with nylon than polyethylene; over-treatment can easily decrease the bulk properties of the polymer.

Biaxially oriented Nylon could also be self-bonded after the surfaces were treated with CSA.

Treated nylon surfaces can be bonded to other treated polymeric surfaces particularly the polyolefins, as well as to other surfaces such as paper.

It was also found that nylon films (or fibers) became highly opaque following short contact with CSA solution or other mineral acid such as concentrated sulfuric acid with the latter giving whiter surfaces. In about 5 to 10 seconds of treatment, opacities of 90% and higher were obtained. The surfaces were also very receptive to printing inks. The treatments were accompanied by a substantial increase in film thickness (e.g. 40 to 100% increase after a 10 secs. treatment; with increased thickness with increased treatment time which in turn is usually accompanied by decreased film strength). Increased bonding pressure tends to decrease the opacity of the laminate.

The above discovery suggests a number of useful products. Products with opaque and highly printable surfaces could be produced from film laminates or fiber networks wherein nylon is present as a fibrous component or as a surface layer in the laminate. Nylons, with a high viscosity number such as Nylon-6 and Nylon 66 (manufactured by BASF and Allied Chemical) are preferred for use in opacification.

POLYACRYLICS

Korad C, a grade of acrylic made by Rohn and Haas, was self-bonded (well below its melting-point) using water as the bonding agent, after its surface had been treated with chrome-sulfuric acid (CSA), washed and air-dried, contained sufficient water for bonding with heated calender rolls; results are shown in following table:

TABLE

| | Nip Rolls | | Peel Strength |
| Temp. | Pressure | | p.l.i. |
|---|---|---|---|
| 70°C | 250 p.l.i. | | 1.7 |
| 70°C | 500 p.l.i. | | 2.1 |
| 70°C | 700 p.l.i. | | 1.9 |

It has been found that the polyacrylic film also becomes highly opaque after treatment with CSA solutions and other mineral acids (the latter yielding whiter surfaces). The treatment conditions and results are very similar to that found for nylon and correspondingly useful products can be made. The bonding effects, however, are not as good as for nylon and the polymer is also more brittle.

POLYESTERS

Mylar, a grade of polyester film made by DuPont, treated with chrome-sulfuric acid (CSA) required higher bonding conditions than that for the previously mentioned polymers. For example, a sample treated for 2 seconds at 80°C. with CSA and self-bonded at 100°C and 60 psi for 6 minutes resulted in a peel strength of 0.6 p.l.i. Since polyester is readily attached by CSA, very short treatment times are required. The treated polyester film bonded readily to paper, especially when heated calender rolls were used.

OTHER EFFECTS

In the above, various effects were referred to when certain non-cellulosic polymeric surfaces treated by the various solutions and gases were treated with water. It was found that not only did water-induced bonding between the polymer itself and other polymers take place but the water treated surfaces took on other adhesive properties. The water treatment, for example, improved the surface's receptiveness to dyes, other bonding agents, coating solutions and the like.

In addition, it was found that the frictional characteristics of the surface changed on adding moisture to the treated surface. For example, by moistening a treated PE surface (CSA treated at 80°C for 120 seconds) the static frictional resistance between the moistened surface and an untreated PE surface increased by 75% and the dynamic frictional resistance by 50% over that for untreated surfaces or for dry treated surfaces. When both surfaces are CSA treated the increase is of course very much higher. By using a particular water treatment pattern (to avoid actual bonding), this property could be used to increase the stackability of PE bags and the like.

OTHER SULFATION SULFONATION-OXIDATION TREATMENTS

While the above used chrome sulfuric, sulfur trioxide and fuming sulfuric acid as examples of sulfating/sulfonating - oxidizing solutions/gases, other such substances have also been found useful.

EXAMPLE 11

Chloro-sulfuric acid and potassium permanganatesulfuric acid solutions, for example, were found useful in treating the various polymers. In certain situations, these solutions especially those containing permanganate, discoloured the polymer surface. The following table illustrates selected results:

TABLE

Peel Strength Obtained with Other Activating Solutions on LDPE

| $KMnO_4$ g | $H_2O$ ml | $H_2SO_4$ g | Peel Strength, p.l.i. After Room Temperature Activation at | | | | | |
|---|---|---|---|---|---|---|---|---|
| | | | 10 sec | 20 sec | 30 sec | 60 sec | 120 sec | 600 sec |
| 10 | 15 | 184 | FF | FF | 0.4 | 0.8 | 0.2 | 0 |
| 10 | 15 | 370 | FF | FF | 1.0 | 0.8 | 0.2 | 0.8 |
| 10 | 15 | 552 | FF | FF | FF | 1.6 | 4.4 | 0.7 |
| $H_2SO_4$ + 25% $SO_3$ (oleum) | | | 15.0 | 14.5 | FF | FF | — | — |

FF = Film Failure

The results indicate rapid surface renewal when permanganate solutions are used.

It is to be noted that not all of the above-mentioned treatments are effective for all of the other mentioned synthetic polymers. Chrome sulfuric acid for example is effective on the polyethylenes, polyamides, etc., but it is not effective on polypropylene. On the other hand, sulfur trioxide (gas or in sulfuric acid) is generally effective on all the above-mentioned polymers.

OTHER SURFACE TREATMENTS

In addition to the above-mentioned surface treatments the following may be found useful in certain circumstances:

a. simultaneous action of chlorine gas and ultraviolet radiation;
b. hydrogen halide or ozone with nitrous oxide;
c. chromic acid;
d. open flame treatment;
e. bombardment with electrons;
f. fuming nitric acid;
g. corona discharge with or without ozone;
h. ozone with or without an ammonia gas or dilute aqueous alkali treatment.

While the above reactions do not include sulfation/-sulfonation under certain circumstances their use can be combined with applicant's discovery of the use of water as a bonding agent for certain non-cellulosic synthetic polymers, e.g. for polymers which are decomposed or attacked by applicant's preferred treatment solutions. Cellulose acetate butyrate and polyurethane, for example, are attached by chrome-sulfuric acid.

In the case of corona treated polyethylene, it was found that the self-bonding of such film could be improved by treatment with water. For example, dry films calendered at 80°C and 200 and 500 psi pressure gave peel strengths of 0.1 and 1 p.l.i. (resp.); on the other hand, if the film were moistened with water or steam, the peel strength increased to 3 p.l.i. when bonded at 80°C and 200 psi pressure.

The preferred treatments of present invention can also be combined with other prior art treatments to yield further improved bonding. For example, certain surfaces subjected to the sulfation/sulfonation - oxidation treatment of the present invention, and then to the flame or corona treatment in the presence of water or water vapour, followed by the remaining steps of the present invention, were found to result in bond strengths stronger than that for the treatment taken singly.

THE ROLE OF WATER

Water has to be present in the treated synthetic polymeric surface of the present invention in order for the surface to possess the required adhesive properties to bond the surface to itself or other surfaces. The amount of water required depends largely on the application and on the pressure applied to the surface; temperature and contact time are also important factors especially as substitutes for pressure (the temperature at all times being below that of the melting point of the treated polymers).

For example it was found that the amount of water and the corresponding bonding pressure required to achieve bonding to a polyethylene surface treated with chrome-sulfuric solution under conditions where no air bubbles were found in the newly bonded area is approximately as follows:

| mg of Water/9 in² | equals mils. between Surfaces | Pressure Applied -p.s.i.- |
|---|---|---|
| 200 to 500 | 1.3 to 3.2 | Contact |
| 60 | 0.4 | 0.3 |
| 10 to 15 | 0.07 to 0.1 | 20 |
| 1 | 0.007 | 60 |

For optimum bonding it is desirable to initiate the bond in the presence of excess water; although bonds can be effected with air-dried surfaces containing very small amounts of water. Once the bonding has occurred most of the bonding water can be removed by drying and the like, this generally results in increased bond strength. The application of higher pressure during and/or after the removal of some of the bonding water will also increase the degree of bonding. After bonding and drying the amount of water may be below 1 mg per square inch.

In the formation of polymeric fiber networks, the problem of removing some of the bonding water after bonding has taken place is not severe as the contact areas are very small. However, in forming film laminates, where contact areas can be very large this problem is more severe if long drying periods are to be avoided. This problem can be alleviated at the expense of achieving less than optimum bonding strength, by removing some of the water prior to bringing the surfaces together and where possible using somewhat higher bonding pressure (and temperature) to offset the lesser amount of water resulting from pre-drying. This water may be removed by absorption/drying, preferably not at the higher temperatures where the quality of the bonding surface may be adversely affected. Bond strength generally improves with storage so while the strength may be low immediately after bonding improvement can be expected with time. This can be particularly attractive where films are wound into rolls and therein subjected to pressure from the winding tension during the storage. In such an instance, the layers should of course be separated by a suitable release paper or film if both sides have been treated.

Once dried, treated surfaces can be reactivated by exposing them to water (liquid or vapour) prior to bonding. Dry treated surfaces can be stored for substantial lengths of time (e.g. 6 months or more) and still be reactivated with water. Treated surfaces can be stored wet for an indefinite period (and remain bondable).

Amphiprotic solvents of high dielectric constant, such as methanol and ethanol, can be substituted for water in the bonding process of the present invention. Substitution of non-amphiprotic substances such as dioxane and acetone result in lower bond strength. The polyolefins appear to be more responsive to the presence of water than the other polymers.

Studies of the treated surface by infrared spectroscopy, sulfur analysis and other analytical techniques have indicated that the reactions of the polymer side chains with the treatment materials involve complex reactions of sulfation/sulfonation in combination with oxidation (e.g. unsaturation, carbonyl, ether and sulfate ester and sulfonic acid group formation). Thus this surface acrivation results in a hydrophilic layer being formed which, with the help or through the agency of water, is able to interdiffuse with other layers being pressed into contact with this active surface. This interdiffusion is further aided by temperature, pressure, contact time, type and depth of treatment.

APPLICATIONS

Many applications of the present invention will immediately suggest themselves on studying the above examples and becoming aware of the discoveries made.

In the field of laminates in general a very wide application is possible for, whenever there is a need to bond or laminate a synthetic polymeric layer (rigid or flexible) to a similar or dissimilar layer, the present invention would most likely be useful. The essential requirement is that the surface of the polymer being treatable by one of the above mentioned substances or media such that only water or methanol or ethanol is required to effect the bond. In fact, the polymeric layer could serve as an intermediary layer to bond two other similar or dissimilar layers together.

Similarly, in the field of non-woven fibrous webs or fabrics, besides laminating these webs together (or to other materials), the present invention can be used to make the webs themselves. And because of the present discovery involving water-induced bonding, these webs can be made from polyolefin, polyamide, polyacrylic fibers in conjunction with both the so-called wet-lay and dry-lay processes. In the wet-lay process much of the present conventional pulp and paper equipment can be used with appropriate modifications; similarly, for the dry-lay equipment such as the Rando-Feeder and Rando-Webber (manufactured by Curlator Corp.) could be found useful, and where steam or water vapour would serve both as a carrying and bonding agent.

One main by-product of the present invention, besides providing a process whereby a large number of present and new products can themselves now be made from polymeric materials without the need of adhesives or the use of temperatures at the melting points of the polymer (which in turn often imparted undesirable properties and characteristics to the products themselves), is that these products will now possess new properties which heretofore they lacked unless given special additional treatment. The surfaces of these products would, for example, depending on the method of treatment and its application, possess one or more of the following properties: printability, dyeability, subsequent/improved bondability to many other substances/surfaces including improved coatability — which are desirable properties for most all products and which heretofor were denied to most polymeric products particularly those made from polypropylene. The wide range of porosities of the fibrous webs made by the present invention would be very useful for products involving filterability. Thicker fibrous webs could find applications in such products/roles as carpet backing.

Although the invention has been described in considerable detail with reference to certain preferred embodiments thereof, it will be understood that variations and modifications can be effected within the spirit and scope of the invention as described hereinabove and as defined in the appended claims.

We claim:

1. A method suitable for producing a composite structure by bonding at least two elements together in which at least the surface of at least one of the elements consists of a non-cellulosic, synthetic polymeric material selected from the group consisting of polyesters, polyolefins and polyacrylics, which comprises treating at least said surface of at least said one element with a treatment member selected from the group consisting of chromo-sulfuric acid, chloro-sulfuric acid, sulfur trioxide and fuming sulfuric acid, removing substantially all of any of the unreacted treatment members from said treated surface, ensuring that water is present on said treated surface to act as a bonding agent, pressing the said treated surface into contact with the surface of at least one other of said elements at a temperature below the melting point of either of said contacting surfaces to bond said contacting surfaces together and form a composite structure.

2. The method of claim 1 wherein said composite structure is a film laminate, both said one element and other element being a film.

3. The method of claim 1 wherein said structure is a fibrous non-woven web, said two elements each comprising a plurality of fibers.

4. The method of claim 3 wherein said first element comprises a plurality of polypropylene fibers, said other element comprising a plurality of wood pulp fibers.

5. The method of claim 3 wherein said one element comprises a plurality of polypropylene fibers, said other element comprising a plurality of polyvinyl alcohol fibers, said polyvinyl alcohol fibers forming between about 1 and about 25% of the fiber, the surface of said polypropylene fibers being treated with fuming sulfuric acid.

6. The process of claim 1 wherein said further element is polyvinyl alcohol fibers.

7. The process of claim 1 wherein said further element is wood pulp fibers.

8. The method of claim 1 wherein said treatment member is sulfur trioxide and said sulfur trioxide is dissolved in an organic solvent.

9. The method of claim 8 wherein said solvent is methylene chloride.

10. The method of claim 1 wherein the step of removing substantially all of any of the unreacted treatment members from said treated surface comprises the step of washing said treated surface with water and allowing water to remain on said treated surface thereafter to act as the bonding agent.

11. The method of claim 10 wherein the step of washing the treated surface comprises the step of washing the treated surface with an aqueous solution of a small amount of a water soluble plasticizer.

12. The method of claim 11 wherein said water soluble plasticizer is present in the aqueous solution in a concentration of under about 0.2%.

13. The method of claim 2 wherein both of the films forming the laminate are treated with one of said treatment members.

14. The method of claim 2 wherein the step of pressing said treated surface into contact with the surface of at least one other of said elements is performed at a temperature below about 100°C.

15. The method of claim 14 wherein said surface is treated at a temperature below about 80°C.

16. The method of claim 15 wherein said non-cellulosic synthetic polymeric material is a polyester.

17. The method of claim 15 wherein said non-cellulosic synthetic polymeric material is a polyacrylic.

18. The method of claim 15 wherein said material is a polyolefin.

19. The method of claim 18 wherein said material is a polypropylene and said treatment member is sulfur trioxide or fuming sulfuric acid.

20. The method of claim 18 wherein said non-cellulosic synthetic polymeric material is polyethylene.

21. The method of claim 20 wherein said treatment member is sulfur trioxide or chromo-sulfuric acid.

22. The method of claim 18 wherein the surface of said one other element consists of a non-cellulosic synthetic polymeric material selected from the group consisting of polyolefins, polyesters, and polyacrylics.

23. A method suitable for manufacturing laminates in which at least one component thereof is selected from the group consisting of polyesters, polyolefins, and polyacrylics, comprising the steps of treating at least one surface of said one component with at least one member selected from the group consisting of chromo-sulfuric acid, fuming sulfuric acid, sulfur trioxide, and chloro-sulfuric acid, removing substantially all of any of the unreacted treatment members from the treated surface of said component, drying said treated surface, storing said one component, contacting said treated surface of said component with water in the liquid or gaseous state when it is desired to bond said one component to a further component, pressing said treated surface of said one component into contact with the surface of the other component at a temperature below the melting point of either of said components to bond said substances together and form a composite structure.

24. The method of claim 23 wherein said one component is polyethylene or polypropylene.

25. The method of claim 24 wherein said other component is a non-cellulostic synthetic polymeric material selected from the group consisting of polyesters, polyolefins, and polyacrylics.

* * * * *

UNITED STATES PATENT OFFICE
CERTIFICATE OF CORRECTION

Patent No. 3,901,755  Dated August 26, 1975

Inventor(s) Wilhelm N. Martin et al.

It is certified that error appears in the above-identified patent and that said Letters Patent are hereby corrected as shown below:

On the cover sheet insert:

-- [30] Foreign Application Priority Data

Great Britain    24334/72    May 24, 1972 --.

Signed and Sealed this

Nineteenth Day of October 1976

[SEAL]

Attest:

RUTH C. MASON
*Attesting Officer*

C. MARSHALL DANN
*Commissioner of Patents and Trademarks*